United States Patent [19]

Takagi

[11] Patent Number: 5,890,113
[45] Date of Patent: Mar. 30, 1999

[54] SPEECH ADAPTATION SYSTEM AND SPEECH RECOGNIZER

[75] Inventor: Keizaburo Takagi, Tokyo, Japan

[73] Assignee: NEC Corporation, Tokyo, Japan

[21] Appl. No.: 766,779

[22] Filed: Dec. 13, 1996

[30] Foreign Application Priority Data

Dec. 13, 1995 [JP] Japan .................................. 7-324305

[51] Int. Cl.$^6$ ................................ G10L 5/06; G10L 9/00
[52] U.S. Cl. ........................................... 704/231; 704/234
[58] Field of Search ................................... 704/231, 234, 704/243

[56] References Cited

U.S. PATENT DOCUMENTS

| 4,720,802 | 1/1988 | Damoulakis | 704/233 |
| 5,450,522 | 9/1995 | Hermansky | 704/233 |

FOREIGN PATENT DOCUMENTS 0 724 251  7/1996  European Pat. Off. .

OTHER PUBLICATIONS

Ming–Whei Feng, Speaker Adaptation Based on Spectral Normalization and Dynamic HMM Parameter Adaptation, Proceedings of IEEE Int'l Conf. on Acoustics, pp. 704–707, May, 1995.

Takagi et al., "Rapid Environment Adaptation for Speech Recognition", *Journal of the Acoustical Society of Japan*, vol. 16, No. 5, Sep. 1995, pp. 274–281.

Rosenberg et al., "Cepstral Channel Normalization Techniques for HMM–Based Speaker Verification", *Proc. of the Int'l Conf. on Spoken Language Processing*, Vo. 94, No. 1, 1994, pp. 1835–1838.

Shinoda et al., "Speaker Adaptation Using Spectral Interpolation for Speech Recognition", *Institute of Electronics, Information and Comm. Engineers*, vol. 77, No. 10, Part 03, 1994, pp. 1–11.

Takagi et al., "Speech Recognition With Environmental Adaptation Function Based on Spectral Copy Images", *Spring Proceedings of the Acoustics Engineer's Association*, 2–P–8, pp. 173–174, (1994).

Shinoda et al., "Speaker Adaptation With Spectrum Insertion For Speech Recognition", *Proceedings of the Electronic Communication Engineer's Association*, A, vol. J 77–A, No. 2, pp. 120–127, (1994).

Furui, "Digital Speech Processing" published by Tohkai University, pp. 154–160, (1985).

Shinoda et al., "Speaker Adaptation Using Probability Distributions in A Tree Structure Array", *Spring Proceedings of the Acoustical Engineer's Association*, 2–5–10, pp. 49–50, (1995).

Rosenberg et al., "Cepstral Channel Normalization Techniques For HMM–Based Speaker Verification", *ICSLP 94*, pp. 1835–1838, (1994).

Feng, "Speaker Adaptation Based On Spectral Normalization And Dynamic HMM Parameter Adaptation", *GTE Laboratories Inc.*, pp. 704–707, (1995).

Zhao, "Iterative Self–Learning Speaker And Channel Adaptation Under Various Initial Conditions", *Department of Electrical and Computer Engineering*, pp. 712–715, (1995).

*Primary Examiner*—David R. Hudspeth
*Assistant Examiner*—Robert Louis Sax
*Attorney, Agent, or Firm*—Foley & Lardner

[57] ABSTRACT

An analyzing unit 1 converts an input speech into a feature vector time series. A reference pattern storing unit 3 stores the feature vector time series obtained by the same manner as in the analyzing unit. A matching unit 2 correlates for time axis the input speech feature vector time series and the reference patterns to one another. An environmental adapting unit 4 performs the environmental adaptation between the input speech feature vector time series and the reference patterns according to the result of matching in the matching unit 2. A speaker adapting unit 6 performs the adaptation concerning the speaker between the environmentally adapted reference patterns from the environmental adapting unit 4 and the input speech feature vector time series.

12 Claims, 5 Drawing Sheets

SPEECH ADAPTATION SYSTEM AND SPEECH RECOGNIZER

BACKGROUND OF THE INVENTION

The present invention relates to a speech recognition based on adaptation techniques in speech recognition and, more particularly, to techniques of improving the recognition performance by effecting adaptation of the difference between an input speech and a speech reference pattern.

It is well known in the art that the recognition efficiency of a speech is reduced due to the character differences between the speech and the speech reference pattern. Among these differences, particularly those which are significant speech recognition efficiency reduction, causes are largely classified into two types. In one of these types, the causes are attributable to the environments in which the speech is produced by the speaker. In the other type, the causes are attributable to the speech of the speaker himself or herself. The environmental causes are further classified into two categories. One of these categories is predicated in background noises or like additive noises which are introduced simultaneously with the speaker's speech and additively affect the speech spectrum. The other cause category is predicated in line distortions, such as microphone or telephone line transmission characteristics distortions, which distort the spectrum itself.

Various adaptation methods have been proposed to cope with the character differences which are attributable to the speech environments. One such adaptation method aims at coping with the two environmental cause categories, i.e., the additive noises and the line distortions, to prevent the environmental speech recognition efficiency reduction. As an example, a speech adaptation system used for the speech recognition system is disclosed in Takagi, Hattori and Watanabe, "Speech Recognition with Environmental Adaptation Function Based on Spectral Copy Images", Spring Proceedings of the Acoustics Engineer's Association, 2-P-8, pp. 173–174, March 1994 (hereinafter referred to as Reference No. 1).

Figure 4:
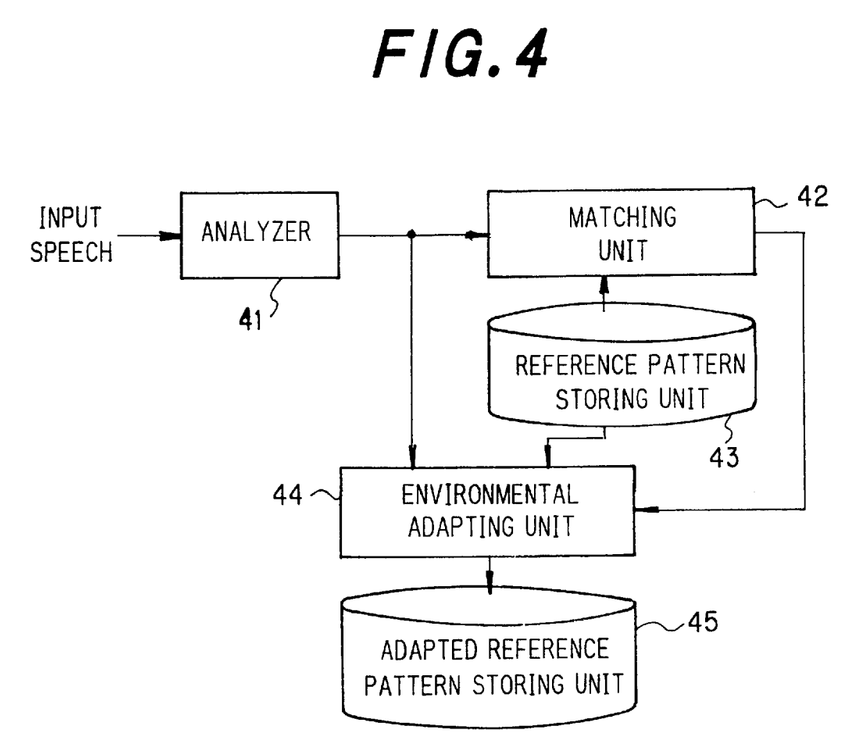
FIG. 4 is a block diagram of a prior speech adaptation system.

FIG. 4 shows the speech adaptation system noted above. The method disclosed in Reference No. 1 will now be described in detail. An input speech which has been distorted by additive noises and transmission line distortions, is converted in an analyzing unit 41 into a time series of feature vectors. A reference pattern storing unit 43 stores, as a word reference pattern, time series data of each recognition subject word which is obtained by analyzing a training speech in the same manner as in the analyzing unit 41. Each word reference pattern is given beforehand labels discriminating a speech section and a noise section. A matching unit 42 matches the time series of feature vectors of the input speech and the time series of word reference patterns in the reference pattern, and selects a first order word reference pattern. It also obtains the correlation between the input speech and the word reference patterns thereof with respect to the time axis. From the correlation between the first order word reference patterns and the input speech feature vectors (pattern) obtained in the matching unit 42, an environment adapting unit 44 calculates the mean vectors of the speech and noise sections of the input speech and each word reference pattern. The speech and noise section mean vectors of the input speech are denoted by $S_v$ and $N_v$, and the speech and noise section mean vectors of the word reference patterns are denoted by $S_w$ and $N_w$. The environment adapting unit 44 performs the adaptation of the reference patterns by using the four mean vectors based on Equation 1 given below. The adapted reference patterns are stored in an adapted reference pattern storing unit 45.

$$W'(k)=\{(S_v-N_v)/(S_v-N_v)\}(W(k)-N_v)+N_v \qquad (1)$$

where $W(k)$ represents the reference patterns before the adaptation (k being an index of all the reference patterns), and $W'(k)$ represents the adapted reference patterns. This adaptation permits elimination of the environmental difference between the reference patterns and the input speech and provision of a speech adaptation system, which is stable and provides excellent performance irrespective of input environment variations.

Figure 5:
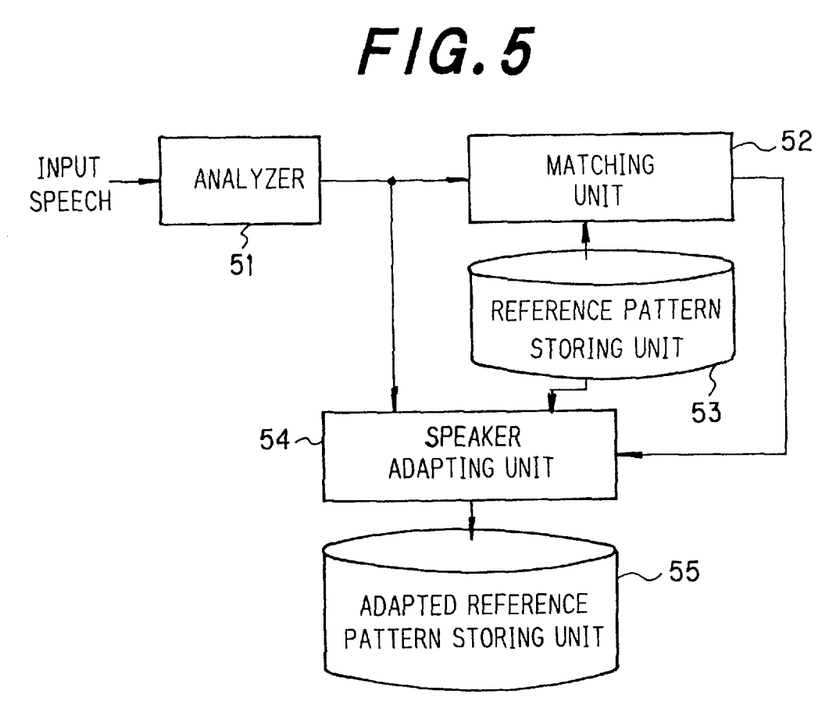
FIG. 5 is a block diagram of another prior art speech adaptation system.

A different prior art adaptation technique which is commonly termed a speaker adaptation technique, has been proposed for the adaptation of the difference with respect to the speaker between a reference speaker's speech and a recognition subject speaker's speech to improve the speech recognition efficiency. This technique is disclosed in Shinoda, Iso and Watanabe, "Speaker Adaptation with Spectrum Insertion for Speech Recognition", Proceedings of the Electronic Communication Engineer's Association, A, Vol. J 77-A, No. 2, pp. 120–127, February 1994 (hereinafter referred to as Reference No. 2). FIG. 5 shows an example of the speech adaptation system employed in this technique. In the system, an analyzing unit 51 converts an input speech collected from the speaker having a different character from the reference speaker into a time series of feature vectors. A reference pattern storing unit 53 stores respective reference patterns which are obtained by analyzing a training speech of the reference speaker in the same manner as in the analyzing unit 51, and has time series multiplication procedures of recognition subject words. A matching unit 52 matches the input speech feature vector time series and each word reference pattern time series stored in the reference pattern storing unit 53, and selects the first order word reference patterns. It also obtains the correlation between the input speech and the word reference patterns with respect to the time axis. While in this embodiment the matching unit 52 selects the first order word reference patterns by itself (speaker adaptation without trainer), in the case of giving the first word reference patterns beforehand (speaker adaptation with trainer), the matching unit 52 may be constructed such that it obtains only the correlation between the input speech and the word reference patterns thereof with respect to the time axis. A speaker adapting unit 54 performs the following adaptation for each acoustical unit (or distribution according to Reference No. 2) on the basis of the correlation between the first order word reference patterns obtained in the matching unit 52 and the input speech feature vectors. The adapted vector $\Delta_j$ for each distribution is obtained as shown below by using the mean value $\mu_j$ of reference pattern distribution j stored in the reference pattern storing unit 53 and the mean value $\mu_j'$ with respect to the input correlated to the distribution j.

$$\Delta_j = \mu_j' - \mu_j \qquad (2)$$

For the distribution having no correlation of the reference pattern in the reference pattern unit 53, the adaptation is performed by using socalled spectrum insertion on the basis of the following Equation 3 which is described in the Reference No. 2.

$$\Delta_i = \Sigma_j W_{ij} \Delta_j \qquad (3)$$

where j represents the category of the reference pattern, in which the acoustical category is present in the input speech. In effect, all the reference pattern distributions are adapted with respect to the speaker after either one of the two equations noted above. The adapted reference patterns are outputted from the speaker adapting unit 54 and stored in an adapted reference pattern storing unit 55.

The prior art speech adaptation system using the environmental adaptation as shown in FIG. 4, however, aims at the sole adaptation of mean environmental differences appearing in the speech as a whole, and is incapable of performing highly accurate adaptation for each acoustical unit such as the speaker adaptation. Theoretically, therefore, the system can not perform sufficient adaptation with respect to the speech, which is free from environmental differences and involves speaker differences alone.

The prior art speech adaptation system using the speaker adaptation as shown in FIG. 5, performs adaptation of differences appearing in the speech as a whole (mainly environmental causes) as well. The result of the adaptation thus retains both speaker differences and environmental differences. Where the speech to be adapted and the speech at the time of the speech recognition are different in the environment, therefore, a satisfactory result of adaptation can not be obtained due to the differences stemming from the environmental differences. A satisfactory result of adaptation also can not be obtained due to the environmental differences in the case where the speech to be adapted and those collected in various different environments are coexistent.

SUMMARY OF THE INVENTION

The present invention seeks to solve the problems discussed above, and its object is to provide a speech adaptation system, which can effect highly accurate adaptation by extracting only environment-independent speaker differences with high accuracy irrespective of the environment, in which the speech to be adapted is collected.

According to the present invention, adaptation with respect to the speaker is performed after environmental differences have been removed from the input speech to be adapted by using environmental adaptation. It is thus possible to provide a highly accurate speech adaptation system, which is not affected by the speech environment of the input speech and solve problems which could not have been solved with the sole prior art speaker adaptation or environmental adaptation.

According to one aspect of the present invention, there is provided a speech adaptation system comprising: a reference pattern storing unit for storing a time series of feature vectors of a reference speaker's speech collected from a reference speaker in a reference speech environment, the time series being obtained by converting the reference speaker's speech in a predetermined manner; an analyzing unit for converting an input speech collected from an input speaker in an input environment into a time series of feature vectors of the input speech in the predetermined manner; a matching unit for time axis correlating the input speech feature vector time series and the reference patterns to one another and outputting the result of matching thus obtained; an environmental adapting unit for adapting the reference patterns according to the result of matching into a state, in which differences concerning the speech environment between the input speech feature vector time series and the reference patterns are adapted, and outputting the environmentally adapted reference patterns thus obtained; and a speaker adapting unit for adapting the environmentally adapted reference patterns into a state, in which differences concerning the speaker between the environmentally adapted reference patterns and the input speech feature vector time series, and outputting the speaker adapted reference patterns thus obtained.

The feature vectors include cepstrum or spectrum, and the environmental adapting unit environmentally adapts the reference patterns by using a difference concerning the cepstrum or logarithmic spectrum between the speech section mean spectra of the input speech and the reference patterns correlated to one another. The environmental adapting unit environmentally adapts the reference patterns by converting the spectrum W(k) of reference patterns k into $$\{(S_v - N_v)(W(k) - N_w)\}/(S_w - N_w) + N_v$$

where $S_v$ is the speech section mean spectrum of the input speech, $S_w$ is the speech section mean spectrum of the reference patterns, $N_v$ is the noise section mean spectrum of the input speech, and $N_w$ is the noise section mean spectrum of the reference patterns, these mean spectra $S_v$, $S_w$, $N_v$ and $N_w$ being obtained between the feature vectors of the input speech and the reference patterns.

The speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, an adapted vector, which is obtained through calculation of an weighted sum of the adapted vectors of the acoustical units with a correlation involved by using weights corresponding to the distances of the acoustical unit from the acoustical units with a correlation involved.

The speech adaptation system further comprises a tree structure reference pattern storing unit, in which acoustical units mutually spaced apart by small distances in the reference patterns are arranged in a tree structure array with hierarchical nodes, the nodes having nodes or acoustical units as children, the lowermost ones of the nodes having acoustical units as children, the nodes each having a storage of a typical adapted vector as the mean adapted vector of all the acoustical units with a correlation involved and the sum of the numbers of correlations involved in all the lower acoustical units, the speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, as the adapted vector of the acoustical unit a typical adapted vector of the lowest nodes among parent nodes of the acoustical units in the tree structure reference pattern storing unit, the parent nodes being selected form those with at least a predetermined correlation sum number.

The speech recognition system comprising the speech adaptation system according to the above, and a recognizing unit for selecting a speaker adapted reference pattern most resembling the input speech and outputting the category to which the selected reference pattern belongs as a result of recognition.

According to other aspect of the present invention, there is provided a speech adaptation system comprising: an analyzing unit for converting an input speech into a feature vector time series; a reference pattern storing unit for converting a reference speaker's speech into a feature vector tine series in the same manner as in the analyzing unit and storing the feature vector time series thus obtained; a matching unit for time axis correlating the input speech feature vector time series and the reference patterns to one another; an environmental adapting unit for making environmental adaptation between the input speech feature vector time series and the reference patterns according to the result of matching in the matching unit; and a speaker adapting unit for making adaptation concerning the speaker between the environmentally adapted reference patterns from the environmental adapting unit and the input speech feature vector time series.

Other objects and features will be clarified from the following description with reference to attached drawings.

PREFERRED EMBODIMENTS OF THE INVENTION

Figure 1:
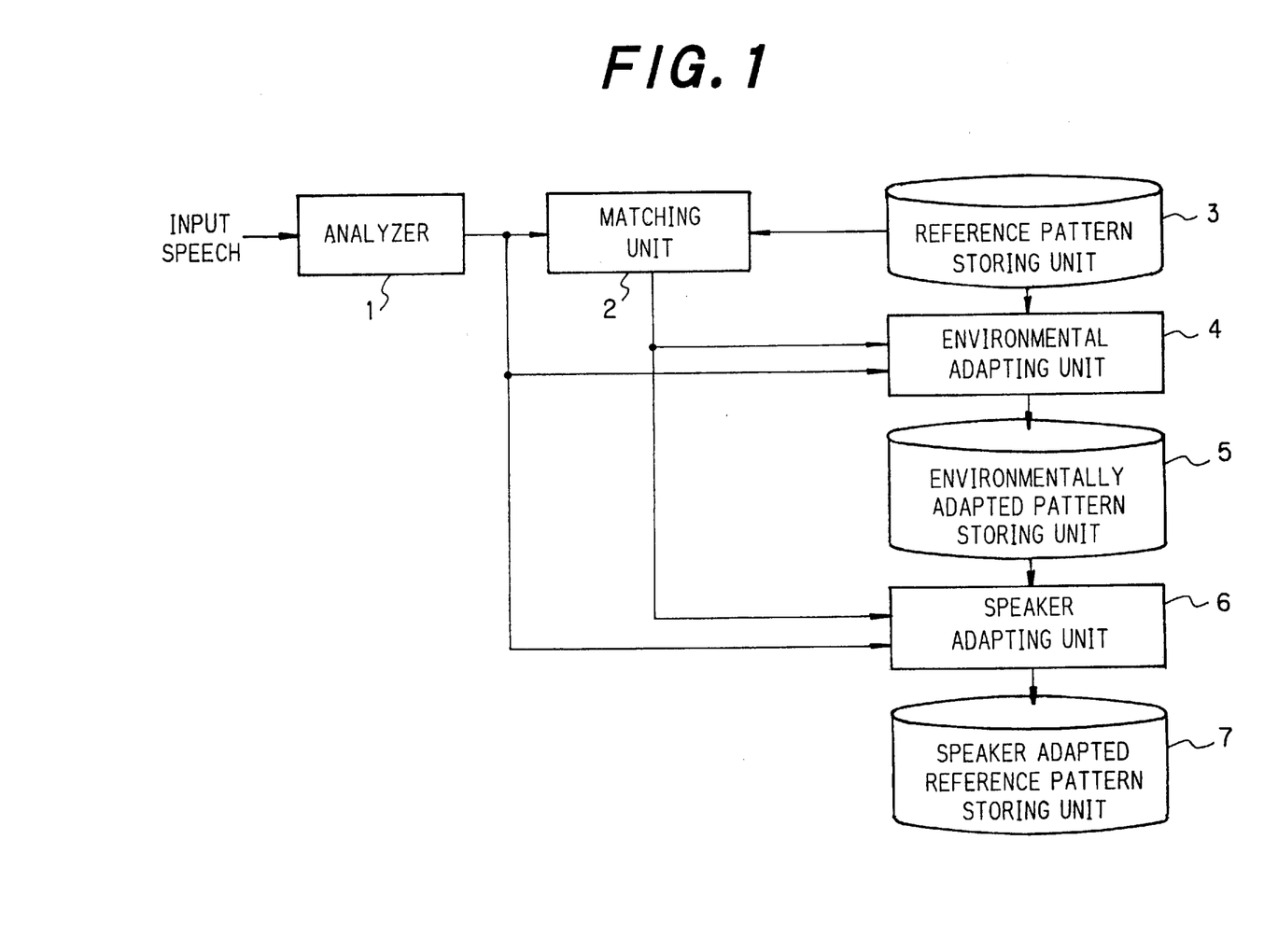
FIG. 1 is a block diagram of the speech adaptation system according to one aspect of the present invention.

The functions of a speech adaptation system according to a first embodiment of the present invention will now be described with reference to FIG. 1. This speech adaptation system uses the technique shown in Reference No. 1 as the environmental adapting unit 4 and the technique shown in Reference No. 2 as the speaker adapting unit 6. However, it is possible to use other techniques as well so long as the environmental adaptation and the speaker adaptation are made. The analyzing unit 1 converts a noise-containing input speech into a feature vector time series. Various extensively adapted feature vector examples are described in, for instance, Furui, "Digital Speech Processing", published by Tohkai University, pp. 154–160, 1985 (hereinafter referred to as Reference No. 3). Here, a case of using spectra obtainable by the LPC analysis, the FFT analysis, etc. is taken, and the spectrum derivation procedures are not described. The time series of an obtained spectrum is also labeled X(t) (t being the discrete time). It is possible to use cepstrum as feature vector. However, since the spectrum and the cepstrum are obviously converse to each other, only the case of using spectrum is described. Generally, it is difficult to accurately collect the leading and trailing ends of the speech, thus leading to cases of missing of a consonant at the leading end of the speech. To avoid such missing, the speech analysis is usually started and ended slightly before and after the start and end of the given input speech. In the reference pattern storing unit 3, reference patterns obtained as a result of analysis of a reference speaker's speech in the same manner as in the analyzing unit 1 are stored beforehand. The matching unit 2 correlates the input speech feature vector time series X(t) and the reference patterns to one another. The environmental adapting unit 4 outputs the mean vectors of the input speech and the reference patterns in the speech and noise sections thereof. The mean vectors of the speech and noise sections of the input speech are denoted by $S_v$ and $N_v$, and the mean vectors of the speech and noise sections of the reference patterns in the reference pattern storing unit 3 are denoted by $S_w$ and $N_w$. The environmental adapting unit 4 adapts the reference patterns by using the four mean vectors and also using Equation 4 below. The environmentally adapted reference patterns are stored in the environmentally adapted reference pattern storing unit 5.

$$W'(t)=\{(Sv-Nv)/(Sw-Nw)\}(W(t)-Nw)+Nv \quad (4)$$

where W(t) represents the reference patterns before the adaptation, and W'(t) represents the adapted reference patterns. It is well known that the reference patterns having been environmentally adapted are free from environmental differences between the input and the reference patterns and have excellent performance with respect to environmental variations. The speaker adapting unit 6 compensates the differences between the reference patterns having been environmentally adapted and the input speech feature vector time series X(t) for each acoustical unit. Here, the acoustical unit is a distribution, and the following adaptation is performed for each distribution.

Using the mean value $\mu_j$ of the distribution j of the environmentally adapted reference patterns and the mean value $X_j'$ with respect to the distribution j', the adapted vector $\Delta_j$ for each distribution is obtained as $$\Delta_j = X_j' - \mu_j \quad (5)$$

With respect to the distributions j having no correlation of the environmentally adapted reference patterns, the adaptation is performed by a process called spectrum insertion represented by Equation 6 shown below as described in Reference No. 2.

$$\Delta_i' = \Sigma_j W_{ij} \Delta_j \quad (6)$$

where j represents the category of the reference patterns, in which an acoustical category is present in the input speech. In effect, all the distributions of the reference patterns are speaker adapted on the basis of either one of the above two equations. The speaker adapted reference patterns are outputted from the speaker adapting unit 6 and stored in the speaker adapted reference pattern storing unit 7. It will be seen that the speaker adapting unit 6 takes the differences for each acoustical unit, which could have not been removed by the environmental adaptation, as differences attributable to the speaker and effects highly accurate adaptation for each acoustical unit.

According to the present invention, since the speaker adaptation is performed after the environmental adaptation, it is possible to provide a speech adaptation system, which permits highly accurate speaker adaptation without being adversely affected by the environments of the input speech. That is, it is possible to obtain effects which can not be obtained with the sole prior art speech adaptation system.

The speech adaptation system shown in FIG. 1 will now be described in detail. This speech adaptation system comprises the analyzer 1, which converts the input speech which is collected from the input speech speaker in the input speech environment in a predetermined manner to an input speech feature vector time series. In the reference pattern storing unit 3, a reference speaker's speech feature vector time series, which has been obtained from the conversion of the reference speaker's speech collected from the reference speaker in a reference speech environment in the same predetermined manner as in the analyzing unit 1, are stored as reference patterns. The matching unit 2 matches the input speech feature vector time series and the reference patterns by correlating the two with respect to the time axis, and outputs the result of matching. The environmental adapting unit 4 adapts the reference patterns according to the result of matching to a state, in which the differences concerning the speech environment between the input speech feature vector time series and the reference patterns have been adapted. The environmentally adapted reference patterns are stored in the environmentally adapted reference pattern storing unit 5. The speaker adapting unit 6 adapts the environmentally adapted reference patterns to a state, in which the differences concerning the speaker between the environmentally adapted reference patterns and the input speech feature vector time series have been adapted. The speaker adapted reference patterns are outputted and stored in the speaker adapted reference pattern storing unit 7.

The analyzing unit 1 converts the input speech, which is collected from an unknown person and contains noise, into a feature vector time series for matching. Conceivable as feature vectors which are extensively applied, are power data, changes in power data, cepstrum, linear regression coefficients of cepstrum, etc. It is also possible to combine them into feature vectors. As further alternatives, it is possible to use the spectrum itself or the logarithmic spectrum. The input speech usually contains non-speech portions in which only ambient noise is present. The reference pattern storing unit 3 stores the reference speaker's speech as reference patterns through analysis made in the same manner as in the analyzing unit 1. The reference patterns may be those using HMM (Hidden Marokov Model) as described in Reference No. 3, pp. 162–170, vector quantized codebooks or speech feature vectors themselves. The matching unit 2 correlates the reference patterns and the input speech feature vector time series to one another. For this correlation, the time axis normalization matching may be made as DP matching or HMM process. The environmental adapting unit 4 performs the adaptation concerning the environment by using the correlation obtained in the matching unit 2.

In a second embodiment of the speech adaptation system according to the present invention, a CMN (Cepstrum Mean Normalization) process is used for the environmental adapting unit 4. As an example, in a speech adaptation system shown in A. E. Rosenberg, et al, "Cepstral Channel Normalization Technique for HMM-Based Speaker Verification", ICSLP 94, S31, 1, pp. 1835–1838, 1994 (hereinafter referred to as Reference No. 4), cepstrum is used as feature vectors, and only speech parts of the input speech are adapted. Specifically, denoting the feature vectors (cepstrum) of the speech parts of the input speech by $y_t$, the mean value of the feature vectors of the speech parts by $y'$, and the mean value of the feature vectors of the reference pattern speech parts by $y(tr)'$, the adaptation is performed as $$y_t \leftarrow y_t - (y' - y(tr)') \tag{7}$$

The cepstrum of the speech parts of the input speech is substituted for by using the mean cepstrum difference between the input speech and the reference pattern speech parts. It is of course possible to substitute for $y_t(tr)$ on the side of the reference patterns for normalization as $$y_t(tr) \leftarrow y_t(tr) + (y' - y(tr)') \tag{8}$$

While the above second embodiment of the speech adaptation system according to the present invention used cepstrum as feature vectors, since the cepstrum and the logarithmic spectrum are obviously in a one-to-one convertible relation to each other, it is possible to use the logarithmic spectrum in substitution for the cepstrum.

A third embodiment of the speech adaptation system according to the present invention, the environmental adapting unit 4 performs the adaptation as in, for instance, Reference No. 1. Denoting the mean spectra in the speech and noise sections of the input speech by $S_v$ and $N_v$, and the mean spectra in the speech and noise sections in the reference patterns by $S_w$ and $N_w$, the environmental adapting unit 4 adapts the reference patterns after, for instance, Equation 9 given below.

$$W(t)' = \{(S_v - N_v)/(S_w - N_w)\}(W(t) - N_w) + N_v \tag{9}$$

where $W(t)$ represents the reference patterns (t being the index of all the reference patterns) before the adaptation, and $W'(t)$ represents the adapted reference patterns. While in this embodiment the reference patterns are adapted, it is also possible to process the input speech in the same manner. While the adaptation is performed on the spectrum, where the feature vectors are the cepstrum, it can be readily realized by providing a cepstrum/spectrum converter. In this case, the mean vectors may be obtained on the cepstrum or after conversion into the spectrum.

The speaker adapting unit 6 performs the speaker adaptation using the environmentally adapted reference patterns from the environmentally adapting unit 4. Generally, various speaker adaptation techniques have been proposed. Here, a commonly termed spectrum insertion technique (Reference No. 2) will be described as a fourth embodiment of the speech adaptation system according to the present invention. It is possible to apply other speaker adaptation techniques similarly to the speaker adapting unit 6. Using the mean value $\mu_j$ of the distributions j of the environmentally adapted reference patterns and the mean value $X_j'$ of the input correlated to the distributions j, the adapted vector $\Delta_j$ of each distribution is obtained as $$\Delta_j = X_j' - \mu_j \tag{10}$$

The distributions i of the reference patterns in the environmentally adapted reference pattern storing unit 5 having no correlation, are adapted using a process called spectrum insertion expressed by Equation 11 as described in Reference No. 2 as $$\Delta_i = \Sigma_j W_{ij} \Delta_j \tag{11}$$

where j represents the category of the reference patterns, in which the acoustical category is present in the input speech. The speaker adapting unit 6 adapts all the reference patterns k which belong to the acoustical category i or j as $$\mu_k' = \mu_k + \Delta \tag{12}$$

where $\Delta$ is either $\Delta_i$ or $\Delta_j$ selected in dependence on the kind of k, $\mu_k$ is either $\mu_i$ or $\mu_j$ selected in dependence on the kind of k, and $\mu_i'$ represents either $\mu_i'$ or $\mu_j'$ in dependence on the kind of k. While this embodiment used the adapted vectors for greatly adapting the reference patterns in the storing unit 5, it is possible to control the degree of adaptation and prevent great adaptation by using, for instance, an adequate coefficient $\alpha$ such as $$\mu_k' = \{(1+\alpha)\mu_k + \Delta\}/(1+\alpha) \tag{13}$$

While in this embodiment the speaker adapting unit 6 adapts only the reference patterns in the environmentally adapted reference pattern storing unit 5, it is of course possible to process the input speech in the same manner.

Figure 2:
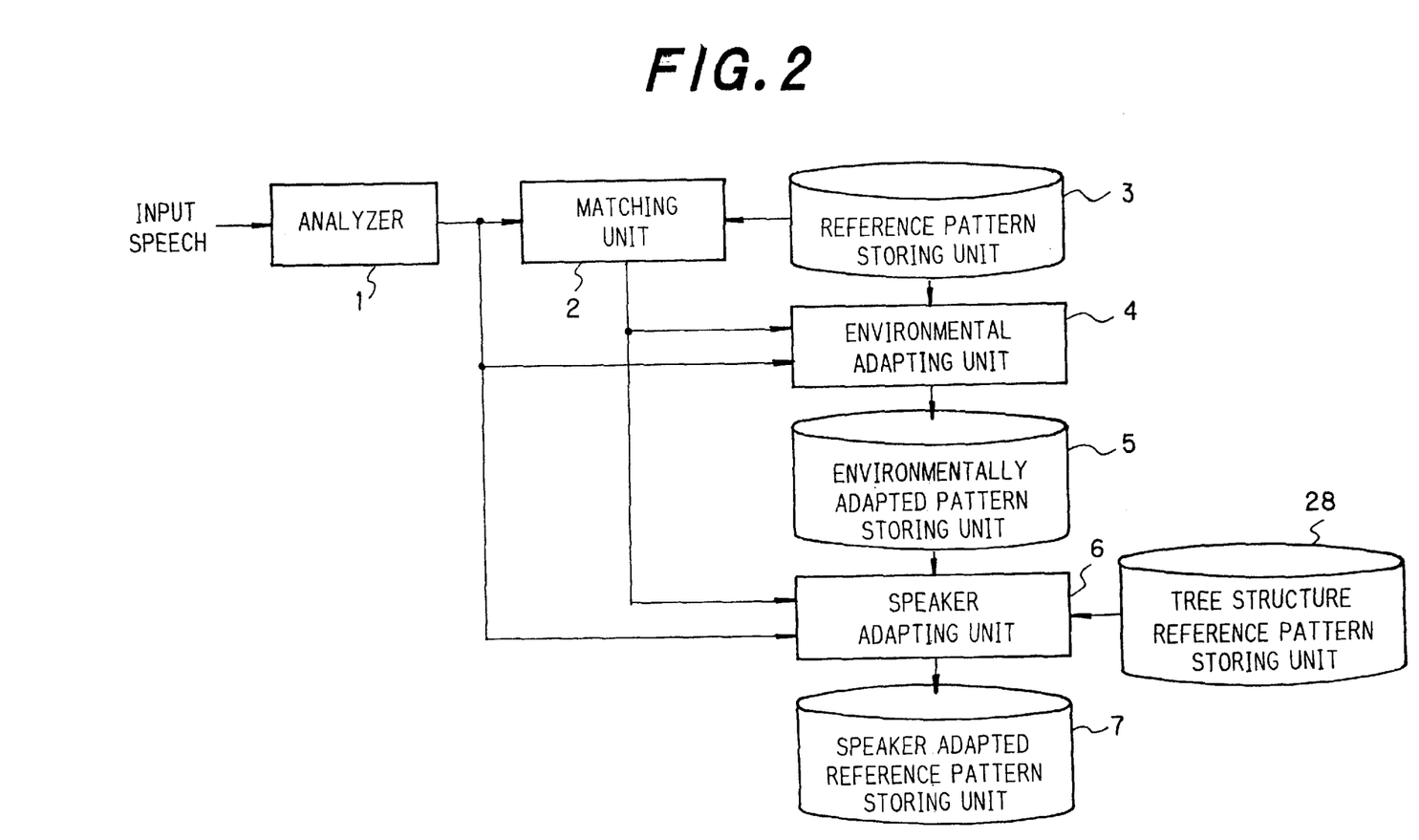
FIG. 2 is a block diagram of the speech adaptation system according to other aspect of the present invention.

FIG. 2 is a block diagram showing a fifth embodiment of the speech adaptation system according to the present invention. This speech adaptation system comprises a tree structure reference pattern storing unit 28 in addition to the speech adaptation system shown in FIG. 1. In the tree structure reference pattern storing unit 28, acoustical units that are mutually spaced apart by small distances in the reference patterns, are arranged in a tree structure array with hierarchical nodes. The nodes have nodes or acoustical units as their children. The lowermost nodes have acoustical units as their children. In each node, a typical adapted vector as the mean adapted vector of all the acoustical units with a correlation involved and the sum of the numbers of correlations involved in all the lower acoustical units are stored. The speaker adapting unit 6 performs adaptation of the reference patterns for each acoustical unit (such as a sound element, a syllable, a distribution, etc.) constituting a part of a word. For an acoustical unit with a correlation or at least a predetermined number of correlations involved, the unit 6 performs adaptation by using the difference or ratio between the mean feature vectors of that acoustical unit and the input speech correlated thereto. For an acoustical unit with no correlation or correlations less in number than a predetermined number involved, the unit 6 performs the adaptation by using, as the adapted vector of that acoustical unit, a typical adapted vector of the lowest nodes among the nodes, of which the sum of the numbers of correlations taking place in all the lower acoustical units is greater than a predetermined number.

The speaker adapting unit 6 uses the tree structure reference pattern storing unit 28 for the adaptation. In the unit 28, all the distributions of the reference patterns stored in the reference pattern storing unit 3 are arranged beforehand in a tree structure array using a method described in Shinoda and Watanabe, "Speaker Adaptation Using Probability Distributions in a Tree Structure Array", Spring Proceedings of the Acoustical Engineer's Association, 2-5-10, pp. 49–50, March 1995 (hereinafter referred to as Reference No. 5). In the array, resembling distributions belong to the same nodes. Using the mean value $\mu_j$ of the distributions j of the environmentally adapted reference patterns and the mean value $X_j'$ of the input correlated to the distributions j, the adapted vector $\Delta_j$ is obtained for each distribution as $$\Delta_j = X_j' - \mu_j \tag{14}$$

For the environmentally adapted reference pattern distributions i having no correlation or correlations less in number than a predetermined number involved, the adaptation is performed in a method as described in Reference No. 5. Specifically, the environmentally adapted reference patterns are adapted by making examination of the tree structure upward from the reef (i.e., lowermost) nodes, and using the typical adapted vector of the nodes with at least a predetermined number of correlations involved as the adapted vectors of these distributions j. The speaker adapted reference patterns are stored in the speaker adapted reference pattern storing unit 7.

Figure 3:
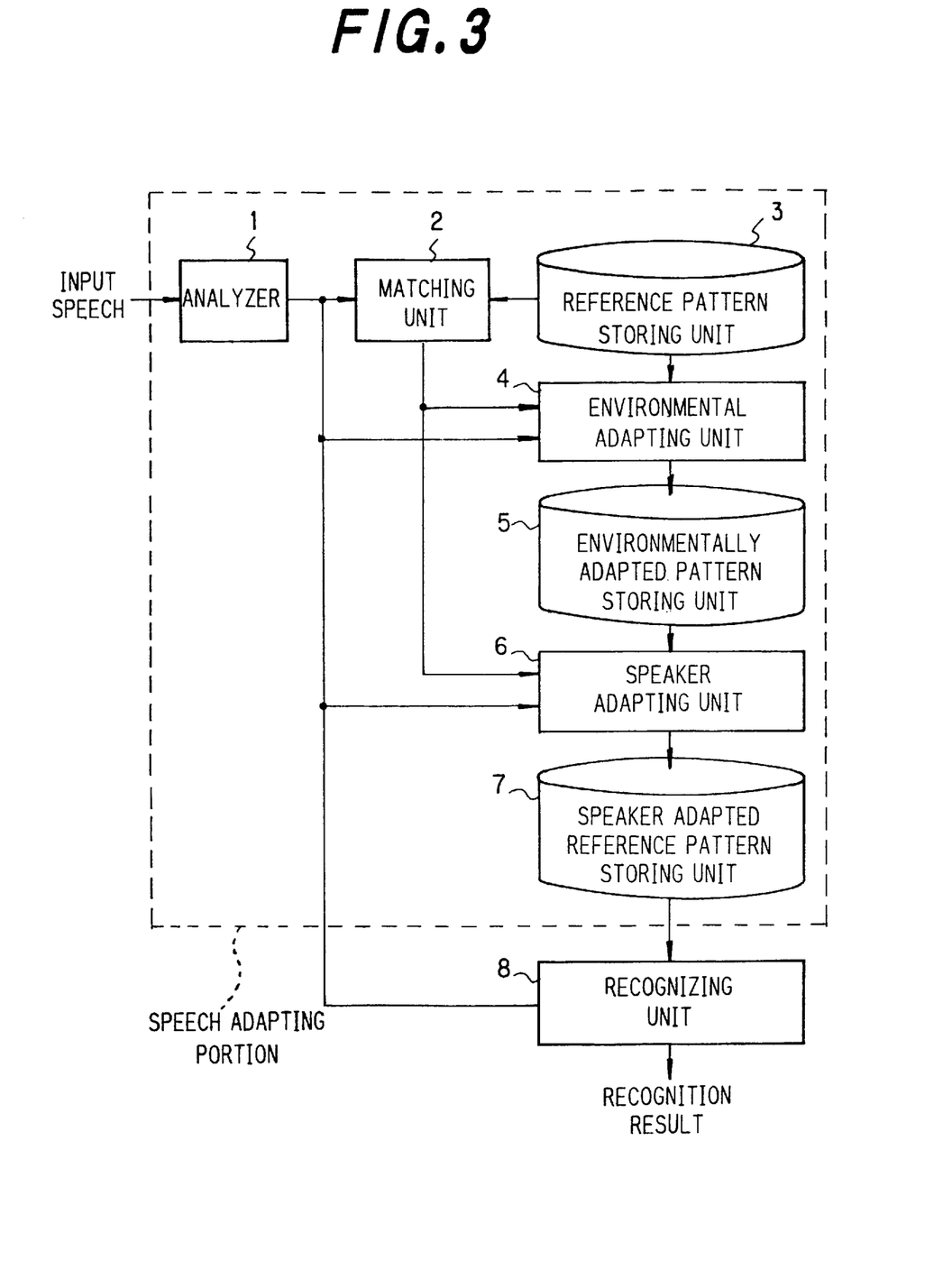
FIG. 3 is a block diagram of the speech recognition system according to the present invention.

FIG. 3 is a block diagram showing a speech recognition system according to the present invention, which is constructed by using the first embodiment of the speech adaptation system according to the present invention. In this speech recognition system, having the speech adaptation system according to either one of the first to fifth embodiments of the present invention, a recognizing unit 8 performs matching like the usual speech recognition between the reference patterns in the speaker adapted reference pattern storing unit 7 and the input speech and outputs a first order result as the recognition result.

As has been shown in the foregoing, the speech adaptation system according to the first embodiment of the present invention performs the speaker adaptation after removal of the environmental differences by the environmental adaptation. It is thus possible to obtain highly accurate adaptation which could not have been obtained as the sole environmental adaptation in the prior art. Besides, in the speaker adaptation only the environment-independent speaker differences can be extracted with high accuracy, so that it is possible to realize highly accurate adaptation.

With the speech adaptation system according to the second embodiment of the present invention, in addition to the effects obtainable with the speech adaptation system according to the first embodiment of the present invention, the environmental adaptation can be obtained with the sole cepstral differences. It is thus possible to provide a system, which is less subject to calculation and memory amount increases and is more inexpensive.

With the speech adaptation system according to the third embodiment of the present invention, in addition to the effects obtainable with the speech adaptation systems according to the first embodiments of the present invention, a higher environmental adaptation accuracy can be obtained compared to that of the speech adaptation system according to the second embodiment of the present invention. It is thus possible to realize a more accurate speech adaptation system.

With the speech adaptation system according to the fourth embodiment of the present invention, in addition to the effects obtainable with the speech adaptation system according to the first embodiment of the present invention, the acoustical units with no correlation involved also be highly accurately adapted. It is thus possible to realize highly accurate speaker adaptation with less data and provide a more accurate speech adaptation system.

With the speech adaptation system according to the fifth embodiment of the present invention, in addition to the effects obtainable with the speech adaptation system according to the first embodiment of the present invention, stable speaker adaptation is obtainable without parameter control corresponding to the data amount that is necessary with the speech adaptation system according to the fourth embodiment of the present invention. It is thus possible to provide a more accurate speech adaptation system.

As a consequence, it is possible to provide a highly accurate speech recognition system, which enjoys the effects obtainable with the speech adaptation systems according to the first to fifth embodiments of the present invention.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A speech adaptation system comprising:
 a reference pattern storing unit for storing reference patterns including a time series of feature vectors of a reference speaker's speech collected from a reference speaker in a reference speech environment which includes first acoustic noise, the time series being obtained by converting the reference speaker's speech in a predetermined manner;
 an analyzing unit for converting an input speech collected from an input speaker in an input environment which includes second acoustic noise, into a time series of feature vectors of the input speech in the predetermined manner;

a matching unit for time axis correlating the input speech feature vector time series and the reference patterns to one another and outputting the result of matching thus obtained;

an environmental adapting unit for continuously adapting the reference patterns according to the result of matching into a state, in which differences concerning the speech environment between the input speech feature vector time series and the reference patterns are adapted, and outputting the environmentally adapted reference patterns thus obtained; and a speaker adapting unit for continously adapting the environmentally adapted reference patterns into a state, in which differences concerning the speaker between the environmentally adapted reference patterns and the input speech feature vector time series are adapted, and outputting the speaker adapted reference patterns thus obtained.

2. A speech adaptation system, comprising:

a reference pattern storing unit for storing reference patterns including a time series of feature vectors of a reference speaker's speech collected from a reference speaker in a reference speech environment, the time series being obtained by converting the reference speaker's speech in a predetermined manner;

an analyzing unit for converting an input speech collected from an input speaker in an input environment into a time series of feature vectors of the input speech in the predetermined manner;

a matching unit for time axis correlating the input speech feature vector time series and the reference patterns to one another and outputting the result of matching thus obtained;

an environmental adapting unit for adapting the reference patterns according to the result of matching into a state, in which differences concerning the speech environment between the input speech feature vector time series and the reference patterns are adapted, and outputting the environmentally adapted reference patterns thus obtained; and a speaker adapting unit for adapting the environmentally adapted reference patterns into a state, in which differences concerning the sneaker between the environmentally adapted reference patterns and the input speech feature vector time series are adapted, and outputting the speaker adapted reference patterns thus obtained, wherein the environmental adapting unit environmentally adapts the reference patterns by converting the spectrum W(k) of reference patterns k into $$\{(S_V-N_V)(W(k)-N_W)\}/(S_W-N_W)+N_V$$

where $S_V$ is the speech section mean spectrum of the input speech, $S_W$ is the speech section mean spectrum of the reference patterns, $N_V$ is the noise section mean spectrum of the input speech, and $N_W$ is the noise section mean spectrum of the reference patterns, these mean spectra $S_V$, $S_W$, $N_V$ and $N_W$ being obtained between the feature vectors of the input speech and the reference patterns.

3. A speech adaptation system, comprising:

a reference pattern storing unit for storing reference patterns including a time series of feature vectors of a reference speaker's speech collected from a reference speaker in a reference speech environment, the time series being obtained by converting the reference speaker's speech in a predetermined manner;

an analyzing unit for converting an input speech collected from an input sneaker in an input environment into a time series of feature vectors of the input speech in the predetermined manner;

a matching unit for time axis correlating the input speech feature vector time series and the reference patterns to one another and outputting the result of matching thus obtained;

an environmental adapting unit for adapting the reference patterns according to the result of matching into a state, in which differences concerning the speech environment between the input speech feature vector time series and the reference patterns are adapted, and outputting the environmentally adapted reference patterns thus obtained; and a speaker adapting unit for adapting the environmentally adapted reference patterns into a state, in which differences concerning the speaker between the environmentally adapted reference patterns and the input speech feature vector time series are adapted, and outputting the speaker adapted reference patterns thus obtained, wherein the speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, an adapted vector, which is obtained through calculation of a weighted sum of the adapted vectors of the acoustical units with a correlation involved by using weights corresponding to the distances of the acoustical unit from the acoustical units with a correlation involved.

4. A speech adaptation system, comprising:

a reference pattern storing unit for storing reference patterns including a time series of feature vectors of a reference speaker's speech collected from a reference speaker in a reference speech environment, the time series being obtained by converting the reference speaker's speech in a predetermined manner;

an analyzing unit for converting an input speech collected from an input speaker in an input environment into a time series of feature vectors of the input speech in the predetermined manner;

a matching unit for time axis correlating the input speech feature vector time series and the reference patterns to one another and outputting the result of matching thus obtained;

an environmental adapting unit for adapting the reference patterns according to the result of matching into a state, in which differences concerning the speech environment between the input speech feature vector time series and the reference patterns are adapted, and outputting the environmentally adapted reference patterns thus obtained;

a speaker adapting unit for adapting the environmentally adapted reference patterns into a state, in which differences concerning the speaker between the environmentally adapted reference patterns and the input speech feature vector time series are adapted, and outputting the speaker adapted reference patterns thus obtained; and a tree structure reference pattern storing unit, in which acoustical units mutually spaced apart by small distances in the reference patterns are arranged in a tree structure array with hierarchical nodes, the nodes having nodes or acoustical units as children, the lowermost ones of the nodes having acoustical units as children, the nodes each having a storage of a typical adapted vector as the mean adapted vector of all the acoustical units with a correlation involved and the sum of the numbers of correlations involved in all the lower acoustical units, wherein the speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, as the adapted vector of the acoustical unit a typical adapted vector of the lowest nodes among parent nodes of the acoustical units in the tree structure reference pattern storing unit, the parent nodes being selected from those with at least a predetermined correlation sum number.

5. A speech recognition system comprising the speech adaptation system according to claim 1, and further comprising a recognizing unit for selecting a speaker adapted reference pattern most resembling the input speech and outputting the category to which the selected reference pattern belongs as a result of recognition.

6. A speech adaptation system comprising:

an analyzing unit for converting an input speech into a feature vector time series;

a reference pattern storing unit for converting a reference speaker's speech into reference patterns including a feature vector time series in the same manner as in the analyzing unit and storing the feature vector time series thus obtained;

a matching unit for time axis correlating the input speech feature vector time series and the reference patterns to one another;

an environmental adapting unit for continuously making environmental adaptation between the input speech feature vector time series and the reference patterns according to the result of matching in the matching unit, the environmental adaptations taking into consideration differences between first acoustic noise received with the reference speaker's speech and second acoustic noise received with the input speech; and a speaker adapting unit for continuously making adaptation concerning the speaker between the environmentally adapted reference patterns from the environmental adapting unit and the input speech feature vector time series.

7. A speech recognition system comprising the speech adaptation system according to claim 2, and further comprising a recognizing unit for selecting a speaker adapted reference pattern most resembling the input speech and outputting the category to which the selected reference pattern belongs as a result of recognition.

8. A speech recognition system comprising the speech adaptation system according to claim 3, and further comprising a recognizing unit for selecting a speaker adapted reference pattern most resembling the input speech and outputting the category to which the selected reference pattern belongs as a result of recognition.

9. A speech recognition system comprising the speech adaptation system according to claim 4, and further comprising a recognizing unit for selecting a speaker adapted reference pattern most resembling the input speech and outputting the category to which the selected reference pattern belongs as a result of recognition.

10. The speech adaptation system according to claim 6, wherein the environmental adapting unit environmentally adapts the reference patterns by converting the spectrum W(k) of reference patterns k into $$\{(S_V-N_V)(W(k)-N)\}/(S_W-N_W)+N_V$$

where $S_V$ is the speech section mean spectrum of the input speech, $S_W$ is the speech section mean spectrum of the reference patterns, $N_V$ is the noise section mean spectrum of the input speech, and $N_W$ is the noise section mean spectrum of the reference patterns, these mean spectra $S_V$, $S_W$, $N_V$ and $N_W$ being obtained between the feature vectors of the input speech and the reference patterns.

11. The speech adaptation system according to claim 6, wherein the speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, an adapted vector, which is obtained through calculation of a weighted sum of the adapted vectors of the acoustical units with a correlation involved by using weights corresponding to the distances of the acoustical unit from the acoustical units with a correlation involved.

12. The speech adaptation system according to claim 6, which further comprises a tree structure reference pattern storing unit, in which acoustical units mutually spaced apart by small distances in the reference patterns are arranged in a tree structure array with hierarchical nodes, the nodes having nodes or acoustical units as children, the lowermost ones of the nodes having acoustical units as children, the nodes each having a storage of a typical adapted vector as the mean adapted vector of all the acoustical units with a correlation involved and the sum of the numbers of correlations involved in all the lower acoustical units, wherein the speaker adapting unit adapts the environmentally adapted reference patterns for each acoustical unit constituting a part of a word in the reference patterns by using, for an acoustical unit with a correlation or at least a predetermined number of correlations involved, an adapted vector as the difference or ratio between the mean feature vectors of the acoustical unit and correlated input speech and, for an acoustical unit with no correlation or correlations less in number than a predetermined number involved, as the adapted vector of the acoustical unit a typical adapted vector of the lowest nodes among parent nodes of the acoustical units in the tree structure reference pattern storing unit, the parent nodes being selected from those with at least a predetermined correlation sum number.

* * * * *